A. W. WILKINSON.
Improvement in the Manufacture of Illuminating Gas.
No. 123,538. Patented Feb. 6, 1872.
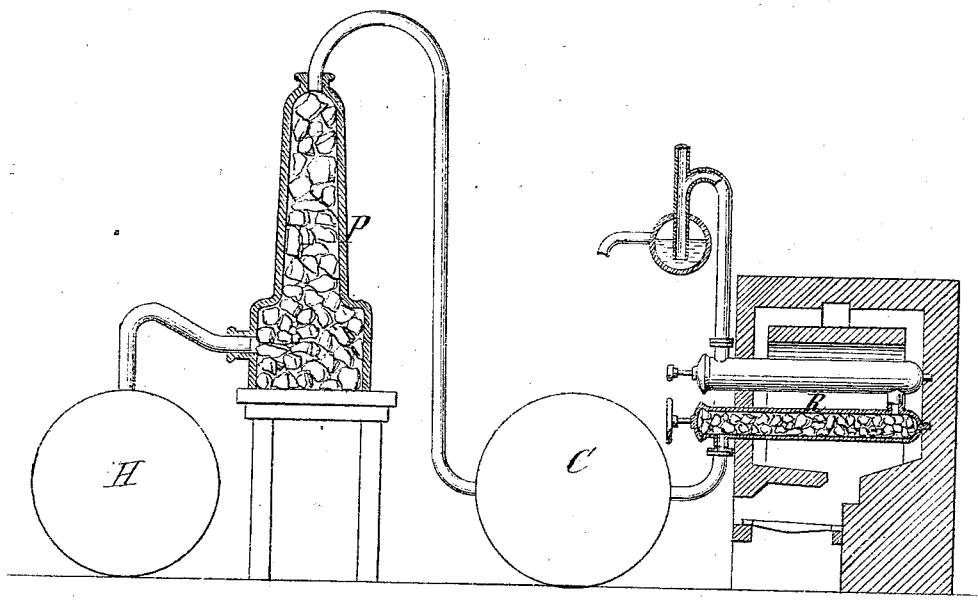

123,538

UNITED STATES PATENT OFFICE.

ASA W. WILKINSON, OF NEW YORK, N. Y.

IMPROVEMENT IN THE MANUFACTURE OF ILLUMINATING GAS.

Specification forming part of Letters Patent No. 123,538, dated February 6, 1872.

*To all whom it may concern:*

Be it known that I, ASA W. WILKINSON, of the city, county, and State of New York, have invented a new and useful Improvement in the Manufacture of Illuminating Gas; and I do hereby declare the following to be a full, clear, and exact description thereof, which will enable those skilled in the art to make and use the same, reference being had to the accompanying drawing forming part of this specification, which drawing represents a sectional view of the apparatus which I have used in carrying out my invention.

This invention consists in passing hydrogen gas first through a purifier, which frees the same from all impurities containing oxygen, such as water (HO) or carbonic oxide (CO); then through a carbureter, whereby the purified hydrogen gas becomes mechanically mixed with hydrocarbon vapors, which mixture is finally passed through a red-hot retort, whereby it becomes a permanent gaseous chemical compound of superior illuminating qualities.

In carrying out my invention I prepare hydrogen gas by any of the well-known methods—that is to say, either by means of zinc and diluted sulphuric acid or by means of hydrate of lime and carbonic oxide. The hydrogen gas obtained by either of these methods is not chemically pure. It is generally mixed with vapors of water or with carbonic oxide, or with both; and if the gas in this impure state is passed through a carbureter and then through a red-hot retort the water becomes decomposed and its oxygen combines with a portion of the carbon taken from the hydrocarbon vapors, forming carbonic acid, which, when mixed with the illuminating gas, materially deteriorates its illuminating power; or, if the hydrogen is mixed with carbonic oxide, this last-named gas, in passing through the red-hot retort, drops a portion of its carbon and becomes converted into carbonic acid, while the carbon forms a deposit in the retort.

The discovery of these facts forms the real base of my invention, and I have succeeded in producing a cheap and superior illuminating gas by the following process:

The hydrogen gas I pass from the receiver H through one or more purifiers, P, containing chloride of calcium or hydrate of lime at a red heat, or other suitable materials capable of absorbing the watery vapors; or the carbonic oxide and other impurities mixed with the hydrogen gas. After the hydrogen gas has been purified I pass it through a carbureter, C, where it takes up a quantity of hydrocarbon vapors, forming, however, a mere mechanical mixture, which cannot be passed through pipes and consumed like a permanent gas, because on being passed through pipes the hydrocarbon vapors condense, and the illuminating power of the mixture is lost or greatly diminished. The mixture of hydrocarbon vapors and hydrogen gas is finally converted into a permanent gas by passing it through one or more retorts, R, heated to a red heat and filled with coke, pieces of brick, or other refractory material, whereby the current of the gas is broken, and the gas is uniformly heated. On leaving the retort the gas mixture has become a permanent gas of superior illuminating quality, as will be readily understood from the following formula, as, for example: The hydrocarbon vapors are composed of $C_{24}H_{30}$, and to these I add six equivalents of hydrogen-gas, and I obtain $C_{24}H_{30} + H_6 = 6(C_2H_2) + 12(CH_2)$; and since the illuminating power of a hydrocarbon gas is in proportion to its specific gravity the superior qualities of my gas will be readily conceded if it is considered that one hundred cubic inches of $C_2H_2$ weigh thirty grains; one hundred cubic inches of $CH_2$, seventeen grains; and one hundred cubic inches of the ordinary street-gas from twelve to fifteen grains.

From the above explanation it will be seen that every volume of hydrogen used produces three times its bulk of illuminating gas—that is to say, one cubic foot of hydrogen produces three cubic feet of illuminating gas. And furthermore, it is a well-known fact that street-gas is contaminated by vapors of chloride of sodium, which impart to the flame a yellow tint, while the flame of my gas is white and brilliant.

My gas requires no purification; but at the same time it contains a sufficient amount of odorous materials to be recognized in case of leakage.

I do not claim making a permanent illuminating gas from hydrogen and the vapor of a liquid hydrocarbon by carrying the same through a heated retort, as such is shown in the patent of John A. Basset, No. 26,644 of January 3, 1860.

What I claim as new, and desire to secure by Letters Patent, is—

The within-described process of converting hydrogen into illuminating gas by first freeing the same from all impurities containing oxygen, then mixing it with hydrocarbons, and finally passing this mixture through a red-hot retort, substantially in the manner set forth.

A. W. WILKINSON.

Witnesses:
W. HAUFF,
E. F. KASTENHUBER.